United States Patent
Matray et al.

(10) Patent No.: US 9,120,076 B2
(45) Date of Patent: Sep. 1, 2015

(54) ADDITIVES FOR TRANSMISSION OILS

(75) Inventors: Emmanuel Matray, Paris (FR); Alain Bouffet, Taluyers (FR); Christian Gonneaud, Communay (FR)

(73) Assignee: TOTAL MARKETING SERVICES, Puteaux (FR)

( * ) Notice: Subject to any disclaimer, the term of this patent is extended or adjusted under 35 U.S.C. 154(b) by 846 days.

(21) Appl. No.: 13/321,350

(22) PCT Filed: May 20, 2010

(86) PCT No.: PCT/IB2010/052248
§ 371 (c)(1),
(2), (4) Date: Feb. 7, 2012

(87) PCT Pub. No.: WO2010/134044
PCT Pub. Date: Nov. 25, 2010

(65) Prior Publication Data
US 2012/0129742 A1 May 24, 2012

(30) Foreign Application Priority Data
May 20, 2009 (FR) .................................... 09 02469

(51) Int. Cl.
*C10M 173/02* (2006.01)
*A61K 9/127* (2006.01)
*B01J 13/16* (2006.01)
*B01J 13/18* (2006.01)
*C10M 171/06* (2006.01)

(52) U.S. Cl.
CPC ............... *B01J 13/16* (2013.01); *B01J 13/185* (2013.01); *C10M 171/06* (2013.01); *C10M 2201/087* (2013.01); *C10M 2207/027* (2013.01); *C10M 2207/144* (2013.01); *C10M 2207/16* (2013.01); *C10M 2207/289* (2013.01); *C10M 2209/084* (2013.01); *C10M 2209/102* (2013.01); *C10M 2215/223* (2013.01); *C10M 2215/28* (2013.01); *C10M 2217/026* (2013.01); *C10M 2217/044* (2013.01); *C10M 2217/045* (2013.01); *C10M 2217/046* (2013.01); *C10M 2219/044* (2013.01); *C10M 2219/08* (2013.01); *C10M 2219/088* (2013.01); *C10M 2219/106* (2013.01); *C10M 2223/04* (2013.01); *C10N 2220/082* (2013.01); *C10N 2230/06* (2013.01); *C10N 2250/16* (2013.01)

(58) Field of Classification Search
CPC .......................... C10M 2201/087; B01J 13/02
USPC ............................................ 508/156; 264/4.1
See application file for complete search history.

(56) References Cited

U.S. PATENT DOCUMENTS

| | | | |
|---|---|---|---|
| 2,987,476 A | 6/1961 | Hartley et al. | |
| 5,112,541 A * | 5/1992 | Friend | ............................ 264/4.7 |
| 6,632,781 B2 | 10/2003 | Harrison et al. | |
| RE44,475 E | 9/2013 | Zakarian et al. | |
| 2003/0207963 A1 | 11/2003 | Zang et al. | |
| 2003/0211950 A1 | 11/2003 | Harrison et al. | |
| 2004/0182711 A1 | 9/2004 | Liang et al. | |
| 2005/0026790 A1 | 2/2005 | Komatsubara et al. | |
| 2007/0145326 A1 | 6/2007 | Joseph et al. | |
| 2009/0270294 A1 | 10/2009 | Souchez et al. | |
| 2010/0113312 A1 * | 5/2010 | Ward et al. | ..................... 508/158 |
| 2011/0177989 A1 | 7/2011 | Bouffet | |

FOREIGN PATENT DOCUMENTS

| | | |
|---|---|---|
| EP | 0 976 813 | 2/2000 |
| EP | 1 972 651 | 9/2008 |
| JP | S6333474 A | 2/1988 |
| JP | H02309099 A | 12/1990 |
| JP | H06175390 A | 6/1994 |
| JP | H0796167 A | 4/1995 |
| JP | 2005036212 A | 2/2005 |
| JP | 2008248085 A | 10/2008 |
| RU | 2303051 C1 | 7/2007 |
| WO | WO 2004/068234 | 8/2004 |
| WO | WO 2008/127423 | 10/2008 |
| WO | WO 2008/151941 | 12/2008 |

OTHER PUBLICATIONS

Masuko, M. et al.; "Prevention of oxidative degradation of ZnDTP by microcapsulation and verification of its antiwear performance;" Tribology International, vol. 41, 2008; pp. 1097-1102.

Crespy, D. et al.; "Polymeric nanoreactors for hydrophilic reagents synthesized by interfacial polycondensation on miniemulsion droplets;" Macromolecules, American Chemical Society, U.S., vol. 40, No. 9, XP-002452917, May 1, 2007; pp. 3122-3135.

\* cited by examiner

*Primary Examiner* — Vishal Vasisth
(74) *Attorney, Agent, or Firm* — Harness, Dickey & Pierce, P.L.C.

(57) ABSTRACT

The subject of the disclosure concerns microcapsules including a core containing one or more alkali metal borates, optionally hydrated, dispersed in one or more lubricating base oils of mineral, synthetic or natural origin, and a polymer shell. Another subject of the disclosure is a lubricating oil including microcapsules. A further subject of the disclosure is the use of microcapsules according to the disclosure as anti-wear and/or extreme pressure additive for lubricant compositions. A further subject of the disclosure is a method for preparing microcapsules by interface polymerization.

11 Claims, No Drawings

ADDITIVES FOR TRANSMISSION OILS

CROSS-REFERENCE TO RELATED APPLICATIONS

This application is a National Phase Entry of International Application No. PCT/IB2010/052248, filed on May 20, 2010, which claims priority to French Patent Application Serial No. 0902469, filed on May 20, 2009, both of which are incorporated by reference herein.

TECHNICAL FIELD

The subject of the present invention concerns novel borated, extreme-pressure additives useful for example in transmission lubricants. These additives provide gears with very efficient protection against pitting phenomena and exhibit improved water resistance.

BACKGROUND

Motor vehicle transmissions often operate under heavy load, which is why lubricants for transmissions contain extreme-pressure additives (EP), which protect the friction surfaces by chemically forming a protective film adsorbed on the surfaces. In particular, lubricants for gear boxes have the role of increasing the resistance of the gear teeth against pitting which is a typical cause of damage through fatigue and which occurs with repeated stress under heavy load. Pitting occurs after a long ageing time and precedes visible deterioration.

The mechanisms are ill-known, but the phenomenon is started by crack initiation at a certain depth below the surface, these cracks propagate and when normal cracks are formed on the surface there is sudden chipping of the material. The prevention of this phenomenon includes reducing contact stresses by means of appropriate geometry of the parts, and reducing friction by preventing adhesion. The lubricant takes part in this prevention process through its viscosity and the physicochemical reactivity of its additives. The specifications for gear lubricants are extremely demanding with respect to pitting resistance.

The extreme pressure additives used in transmission formulations may be compounds containing sulfur, phosphorus, sulfur phosphorus, nitrogen and sulfur, chlorine, boron, such as sulfurized olefins, phosphates, dithiophosphates, dithiocarbamates, borates of hydrated alkali metals. The most common extreme pressure additives that are most frequently used are the compounds containing sulfur, phosphorus or sulfur phosphorus. However, the borates of hydrated alkali metals are also used in transmission lubricant compositions as extreme pressure additives since they offer both excellent load capacity and good thermal stability.

The acceptable temperature range for borates is much wider than for sulfur-phosphorus compounds (from 0° C. to 150° C.), and at the current time no technology using sulfur, phosphorus or sulfur-phosphorus additives allows to achieve the level of performance which is achieved with borates in terms of pitting protection. As a result, when transmission oils containing borates as EP additives are used in gear boxes, it is not essential for the gear teeth to have been subjected to costly surface treatment to reinforce their intrinsic resistance to pitting.

Borates act as non-sacrificial film on friction surfaces, being deposited through electro-deposition. Also, a tribochemical film of boron nitride may be formed (under extreme conditions of pressure and temperature) through the reaction of the borates with their succinimide environment or with the nitrogen present in the teeth material. Both the electro-depositing and the tribochemical film protect the surfaces under extreme pressure contact.

In addition to these excellent EP properties, borates also have good resistance to oxidation, are odourless, non-toxic, do not react with elastomer seals (avoiding leakage problems) and are not aggressive with respect to metals. The borates used as extreme pressure additives in lubricants are typically in the form of solid crystalline nanospheres, generally of diameter comprised between 1 and 300 nm, dispersed in the oil matrix by means of surfactants.

Despite their excellent extreme pressure performance and their numerous advantages, the use of borates is not desirable however when there is a risk of contamination of the lubricant by water. Since inorganic borates are partly soluble in water, the quantity of water present in the molecule may increase, which will have the effect of changing the structure of the borate. In the presence of a large amount of water in the medium, the borates with subsequently modified structure may crystallize and form bladed crystals of size greater than 100 μm.

When the phenomenon of crystallization is initiated, the proportion of spherical borates is reduced, the proportion and the size of the crystals are increased and as a result the quality of the borates, in terms of anti-wear and extreme pressure properties, is decreased. In this case, the borates may even seize up the synchronization systems of gear boxes. It is therefore necessary to protect the borates against water for full guaranteeing of their mechanical properties and to avoid any seizing of gears.

One solution, for example, may consist of adapting gear boxes accordingly by designing sealing systems, but which entails additional complexity for manufacturers. The problems of the sensitivity of borated oils to water are well known in the profession and have never been fully solved in spite of improvements made. The main work on improvement has focused on the environment of the borates (dispersants, detergents, friction modifiers . . . ) to limit the entry of water into the core of the additive or to modify their degradation kinetics.

Application EP 0 976 813 for example discloses EP additive compositions for transmission lubricants containing from 30 to 70% by weight of borates of hydrated alkali metals, from 10 to 30% of organic polysulfides, from 1 to 20% of alkyl succinic acid ester of polyol, from 0.5 to 20% of an overbased sulfurized salicylate detergent or of an overbased sulfurized salicylate/phenate mixture, and optionally up to 20% of a fatty acid ester of a polyol. Application EP 1 298 191 discloses lubricating compositions comprising borates of hydrated alkali metals dispersed in a base oil, and mixture of dispersants comprising a succinic polyalkylene dispersant and a metal salt of polyisobutenyl sulfonate. Document US2007/145326 describes compositions intended to release heat and comprising an encapsulation layer and a core comprising a matrix and a heat delivery agent, the heat delivery agent being surrounded by a hydrophobic wax.

However, surrounding borates with dispersants and specific friction modifiers does not allow complete disappearance of the formation of bladed crystals in the presence of water, which means that they still cannot be used in gear boxes not provided with sealing systems. There is therefore a need for novel solutions allowing borates to be protected against water in lubricating compositions.

It is the objective of the present invention to solve this problem through the microencapsulation of borates in microparticles comprising a protective shell. Microencapsulation is a process via which a product is enclosed in hollow microparticles comprising a shell or membrane (typically polymeric) enclosing a solid or liquid core containing the said product. These microparticles, whose diameter is typically between 0.1 and 1000 µm, are designated under the term of microcapsules. Depending on the encapsulated molecules, applications are found in the areas of agriculture (fertilizers, pesticides), health (medications), cosmetics, textiles.

Application WO 2008/151941 for example discloses a method for producing microcapsules having a core consisting of a liquid hydrocarbon and a wax, surrounded by a polymer membrane of acrylic or aminoplast resin type. This application also cites numerous possible applications for microcapsules. M Masuko et al./Tribology International 41 (2008), 1097-1102 also describe the preparation of microcapsules containing an anti-wear additive used in lubricants, zinc dialkyl dithiophosphate, to improve the resistance of this additive to oxidization. U.S. Pat. No. 5,112,541 also describes the microencapsulation of lubricants and oil-soluble additives. However, all prior art processes allowing these microcapsules to be obtained have recourse to a step for forming an emulsion of a hydrophobic oil phase, for example a lubricating oil optionally containing additives, dispersed in an aqueous medium followed by polymerization at the oil/water interface.

It is not desirable to produce borate-containing microcapsules using these prior art methods, since the very objective sought by microencapsulation here is to protect borates against water. The implementing of the prior art techniques would in our case lead to modification of the structure of borate crystals in contact with water, which would make them unfit for use as extreme pressure additive in lubricants, particularly transmission lubricants. The interface polymerization techniques of the prior art are in general not suitable for preparing microcapsules comprising:
  a core containing a hydrophobic phase and additives, and
  a polymer shell,
  when the performance of the said additives is degraded by water.

There is therefore a need for methods allowing microcapsules to be produced which comprise a polymeric membrane and a core comprising a hydrophobic phase and additives, without using any aqueous phase, so as to protect said additives against degradation by water. Said method is a further subject of the invention.

SUMMARY

The subject of the present invention relates to microcapsules comprising:
  a core containing one or more borates of alkali metals, optionally hydrated, dispersed in one or more mineral, synthetic or natural lubricating base oils, and
  a polymer shell.

Preferably, the borates of alkali metals contained in the core of these microcapsules are compounds of general formula:

$$MO_{1/2} \cdot mBO_{3/2} \cdot nH_2O \quad (I)$$

where M is an alkali metal, preferably sodium or potassium, m is a number between 2.5 and 4.5 and n is a number between 0.50 and 2.40, the monomer repeat unit of formula (I) possibly being repeated several times. Preferably, the polymer of the shell is chosen from among polyesters, polyurethanes, polyamides, polyureas, or the copolymers thereof, polyacrylonitriles, vinyl resins or aminoplast resins, preferably from among the polyureas.

According to one embodiment, these microcapsules have a diameter of between 0.1 µm and 50 µm, preferably between 0.1 µm and 1 µm. Preferably, the borates contained in the core of microcapsules are nanospheres having a diameter of between 1 and 300 nm, preferably between 10 and 200 nm, preferably between 20 and 40 nm. Preferably, the core further contains oil-soluble dispersants, preferably chosen from among sulfonates, preferably polyisobutenyl sulfonates, salicylates whether or not sulfurized, naphtenates, phenates whether or not sulfurized, polyalkylene succinimides, preferably polyisobutenyl succinimides, amines or quaternary ammoniums, either alone or in a mixture.

A further subject of the present invention is a lubricating oil comprising microcapsules such as described above. Preferably, the lubricating oil has a weight content of boron element, measured in accordance with standard NFT 60-106, of between 500 and 5000 ppm. This lubricating oil may further comprise:
  one or more anti-wear and extreme-pressure additives, preferably chosen from among organic polysulfides, phosphates, phosphites, dimercaptothiadiazoles, benzotriazoles, and/or
  one or more friction modifiers, preferably chosen from among the monoesters of polyols and fatty acids.

A further subject of the present invention is the use of lubricating oil such as described above as transmission lubricant, preferably as lubricant for gear boxes or axles.

A further subject of the present invention is a method for preparing microcapsules by interface polymerization, in which a hydrophobic phase denoted S1, containing a first monomer denoted M1 and one or more additives, is dispersed in a continuous phase formed by a non-aqueous organic solvent denoted S2, non miscible with said hydrophobic phase, and containing either an initiator permitting chain polymerization of M1, or a monomer M2 leading to a polycondensation reaction with M1, to form polymers or copolymers that are the constituents of the shell of the microcapsules. Preferably, the method for producing microcapsules comprises the steps of:
  (1) dissolving a monomer M1 in a hydrophobic phase S1 comprising one or more oils, waxes or greases of mineral, synthetic or natural origin, and one or more additives,
  (2) forming a dispersion of the mixture derived from step (1) in a continuous phase comprising a solvent S2 and optionally one or more surfactants,
  (3) adding to said continuous phase, an initiator allowing the chain polymerization of M1, or a monomer M2 leading to a polycondensation reaction with M1, to form polymers or copolymers being the constituents of the shell of the microcapsules.

According to one embodiment, the solvent S2 is a polar aprotic solvent having a dielectric constant higher than 25, preferably higher than 30. Preferably the solvent S2 is selected from among dimethylsulfoxyde (DMSO), 1-methyl-2-pyrrolidone, acetonitrile, methanamide, methylmethanamide, dimethylmethanamide, ethanamide, methylethanamide, dimethylethanamide. According to one embodiment, the dispersion of the hydrophobic phase in the continuous phase is conducted with one or more surfactants, preferably contained in the solvent S2.

Preferably, said surfactants are non-ionic surfactants with a HLB of between 10 and 15. They are preferably chosen from among fatty alcohols, fatty amines, fatty acids, esters of fatty acids and of monoalcohols or polyols, these compounds being or not being ethoylated, preferably ethoylated oleic acid, ethoylated tristyrylphenol, polyoxyethylene sorbitol hexaoleate. According to one embodiment, the hydrophobic phase S1 comprises borates of alkali metals, optionally hydrated, dispersed in one or more lubricating oils of mineral, synthetic or natural origin.

The monomers M1, and optionally M2, are preferably at least difunctional monomers, preferably di- or trifunctional. According to one embodiment, an initiator allowing the chain polymerization of M1 is dissolved at step (3). According to another embodiment, a monomer M2 is dissolved at step (3). In this latter embodiment, preferably M1 is an acid dichloride or diisocyanate and M2 is a diol or a diamine.

A further subject of the present invention is a method such as described above for producing microcapsules according to the invention. A further subject of the present invention is the use of the microcapsules such as described above as anti-wear and/or extreme-pressure additive for lubricating compositions.

DETAILED DESCRIPTION

Microcapsules

The term "microcapsules" means hollow microcapsules comprising a shell or membrane (typically polymeric) enclosing a solid or liquid core, containing an active substance to be protected and to be released in controlled manner. These microparticles, having a diameter typically of less than 1000 µm, in particular of between 0.1 and 1000 µm, are designated under the term of microcapsules.

The microcapsules of the invention are approximately of spherical shape. When speaking in terms of diameter, or size of the microcapsules, reference is made to their largest dimension. The diameter of the microcapsules according to the invention is preferably between 0.1 and 50 µm, more preferably between 0.2 and 10 µm, or between 0.1 and 1.5 µm, or between 0.3 and 4 or between 0.4 and 3 or between 0.1 and 1 µm. It is desirable that the microcapsules should be of homogeneous size. It is also desirable that the preferably homogeneous size is of the order of a few hundred nanometres, typically less than 4 microns, for example less than 3 microns, in particular less than 1 or 2 microns, so as to facilitate the placing in suspension thereof in the lubricating oil in which they are to be incorporated as additives.

Having regard to the size of the spheres of borates to be encapsulated, of the order of at least a few tens of nanometres, even a few hundred nanometres, it is difficult to obtain microcapsules of less than 0.1 µm, even less than 0.2 µm, effectively containing borates. The size of the microcapsules can be measured by observation under optical microscopy with magnification of the order of 1000, or using any other techniques known to the person skilled in the art.

Core

The core of the microparticles according to the invention comprises borates of alkali metals, optionally hydrated, typically in the form of solid nanospheres dispersed in one or more lubricating base oils.

a. Borates:

A borate is a salt of an electropositive compound with a boron and oxygen compound, optionally hydrated. Mention may be made for example of the salts of the borate ions $BO_3^{3-}$ and metaborate ions $BO_2^-$. The borate ion $BO_3^{3-}$ may form various polymer ions, for example the triborate ion $B_3O_5^-$, tetraborate ion $B_4O_7^{2-}$, pentaborate . . . .

In the present application, the term of borates is meant to designate the borates of alkali metals, optionally hydrated. These are preferably compounds which can be represented by the general formula:

$$MO_{1/2}.mBO_{3/2}.nH_2O \qquad (I)$$

where M is an alkali metal, preferably sodium or potassium, m is a number of between 2.5 and 4.5 and n is a number of between 0.5 and 2.4. This monomer repeat unit of formula (I) may optionally be repeated several times.

The borates of sodium or potassium are preferred in gear box applications since they have better water tolerance. In particular, preference is given to the borates of sodium or potassium having an elementary metal/boron ratio of approximately between 1:2.5 and 1:4.5, or 1:2.75 to 1:3.25, preferably of the order of 1:3 and in particular the potassium triborates of formula $KB_3O_5.nH_2O$.

To prepare borates in the form of additives which can easily be used in lubricating compositions, a dispersion of solid nanospheres of amorphous borate is formed, for example having a mean diameter of between about 1 and 300 nm, dispersed in a lubricating base by dispersants which may be succinimides, sulfonates, . . . . Typically, these spheres have a diameter of between about 10 and 200 nm, typically less than 100 nm or less than 50 nm, preferably between 20 and 40 nm. These dimensions may be measured for example under optical microscopy with a magnification of the order of 1000, or using any other techniques known to the person skilled in the art.

An additive for transmission lubricants containing spheres of triborates may be prepared for example by emulsifying an aqueous solution of $K_2B_4O.4H_2O$ and of $KB_5O_8.4H_2O$ in a mineral oil stabilized by succinimide and calcium sulfonate dispersants. The evaporation of water at 150° C. gives borates in their solid form. The viscosity and the polarity of the additive thus obtained is equivalent to the viscosity and polarity of the oil medium in which the dispersion is made.

The preparation of dispersions of borates capable of forming the core of microcapsules according to the invention is described for example in application EP 1 298 191, paragraphs [0064] to [0066]. Typically, these dispersions contain between 5 and 10%, even 15% by weight of Boron element, measured as per standard NFT 60-106.

b. Dispersants:

The core of the microcapsules according to the invention contains borates dispersed in one or more mineral, synthetic or natural base oils. Any dispersant known to those skilled in the art of lubricants can be used to disperse the borates in the microcapsules of the invention.

Examples of dispersants which can be used in the present invention are described under the name "surface active agents", in U.S. Pat. No. 2,987,476 (column 3, line 35 to column 9, line 12). These are anionic compounds for example such as oil-soluble salts of organic acids having at least 8 carbon atoms, sulfonates, phenates, salicylates, naphtenates, preferably salts of alkali or alkaline-earth metals or salts of amines. They are also cationic compounds such as organic amines, imides, or quaternary ammoniums. These compounds can be used alone or in a mixture.

The compounds containing nitrogen, in particular of succinimide type, have a synergic effect with borates since they contribute towards the formation of a tribofilm of boron nitride, which reinforces the activity of borates with regard to the reducing of friction and extreme pressure. In the present invention preference is given to microcapsules whose the core contains at least one dispersant of succinimide type.

Application EP 1 298 191 for example describes dispersions of borates in a lubricating oil prepared with a mixture of a dispersant of polyalkylene succinimide type, in particular polyisobutene succinimide (PIB succinimide) and a metal salt of polyisobutenyl sulfonate. Application EP 0 976 813 describes compositions of borates in lubricating oil comprising as dispersants the reaction product of a polyalcohol, pentaerythritol, with a PIB succinimide, and alkylsalicylates and sulfurized alkylphenates. Said mixtures may also be used as dispersants in the cores of microcapsules according to the invention.

c. Lubricating Oil:

The lubricating oil acting as medium for the preparation of the nanospheres of the borates may be any lubricating base oil, of mineral, synthetic or natural origin. Commercially available dispersions are typically prepared in Group I mineral base oils, for example of type 150 NS, but it is possible for example to use mineral bases of group II or III, synthetic bases of polyalphaolefin type or esters, bases of natural origin for example containing methyl esters of fatty acids, . . . or any other base adapted for such use.

For the purpose of microencapsulation, preference is given to dispersions in which the quantity of base oil is minimal, in order to increase the efficacy of the additives thus produced. Commercial dispersions contain in the range of 35% by weight of base oil. Preference is given to dispersions containing no more than 35% by weight of one or more base oils, preferably no more than 25%, more preferably no more than 20% and further preferably no more than 15 weight % of base oil.

Polymer Shell

The advantage of microcapsules is the presence of a protective shell which insulates the active substances from the outside environment, providing controlled release thereof in particular through rupture of the shell. The shell of the microcapsules according to the invention is intended to protect the borates from water which may be eventually present in a transmission lubricating oil when in service. In the microcapsules according to the invention, it is not desired to obtain progressive diffusion of borates through the shell wall, but a release of borates at the metal-metal contact. It is therefore not desirable that the borates should be released other than by rupture of the microcapsules under strong pressure, of the order of GPa, existing at the contact.

Therefore, it is desirable that the walls of the microcapsules should be slightly porous, formed of strongly cross-linked polymer. This is why it is preferred, for the production of the microcapsules according to the invention, to use di- or trifunctional monomers i.e. monomers having several times the chemical function involved in the polymerization reaction.

It is also desirable that the constituent polymers of the shell of the microcapsules according to the invention should have good heat resistance (i.e. do not degrade at extreme temperatures which may be encountered when in service i.e. of the order of 150 to 160° C.), and good mechanical strength so that they can withstand the high shear levels encountered in gear boxes. The shell of the microparticles according to the invention may be formed for example of polymers of polyester, polyamide, polyurethane, polyurea type, or the copolymers thereof, optionally with other monomers, polyacrylonitriles, vinyl resins or aminoplast resins obtained by condensation of ureas and formol . . . . Polyureas, known for their good properties as water barriers, are particularly preferred. They also have good mechanical resistance and good heat resistance.

The shell of the microcapsules according to the invention will be all the more efficient if it is formed of a polymer material having a water-insoluble or hydrophobic nature. A said compound does not have the capacity to interact with water, and in particular to set up hydrogen bonds with water. This is particularly the case with the above-mentioned polymers and with most polymers obtained from hydrocarbon derivatives. Some polymers of unsaturated carboxylic acid, in particular the polymers of acrylic and methacrylic acid are to be avoided on account of their capacity to form gels with water. Preference is therefore given to microcapsules whose shell comprises at least one hydrophobic polymer.

The microcapsules of the invention can be used as anti-wear and extreme pressure additives in lubricating compositions, in particular lubricants for transmissions, particularly gear boxes and axles, preferably manual gear boxes and heavy vehicle axles. When in service, the shell of the microcapsules protects the borates from water which may be present in the oil medium. The borates are released at the metal-metal contact where pressures are very high (GPa), and then play their conventional role as extreme pressure additive by forming a film on the surface of the friction parts.

Lubricating Transmission Oil

A further subject of the invention relates to lubricants comprising the above-described microcapsules. The microcapsules of the invention can be incorporated in lubricating compositions in variable quantities depending on the use and the quantity of hydrated borates they contain.

The lubricating compositions comprising the microcapsules according to the invention are used in particular as lubricants for transmissions, whether for light or heavy vehicles, more preferably for gear boxes, axles and further preferably for manual gearboxes and heavy vehicle axles. Typically, in lubricating compositions for gear boxes, the weight percent of the said microcapsules is adjusted so that the weight content of boron element in the gear box oil measured as per NFT 60-106 is between 500 and 5000 ppm, preferably between 1000 and 3000 ppm, or between 1500 and 2800 ppm, preferably of the order of 2500 ppm.

Other Additives

The lubricating compositions according to the invention may also contain any type of additive adapted to the use thereof, in particular other anti-wear and extreme-pressure additives, friction modifiers, antioxidants, detergents, dispersants, corrosion inhibitors . . . .

d. Anti-Wear and Extreme Pressure Additives:

These additives are most often sulfur, phosphorus or sulfur-phosphorus compounds, for example dithiocarbamates, thiadiazoles, dimercaptothiadiazoles, benzothiazoles, organic polysulfides in particular sulfurized olefins, in particular trisulfides, alkyl phosphates or alkyl phosphonates, phosphoric acid, phosphorous acid, the mono- di- and tri-esters of phosphorous acid and phosphoric acid, and the salts thereof, thiophosphoric acid, thiophosphorous acid, the esters of these acids and the salts thereof, and dithiophosphates, . . . . All these compounds can be used alone or in a mixture in the lubricating compositions of the invention.

e. Friction Modifiers:

For example, these are fatty alcohols, fatty acids, fatty amines, esters in particular esters of fatty acids and of polyols, for example pentaerythritol monooleate, phosphites or phosphates already cited above as anti-wear and extreme-pressure additives. The transmission oils of the invention may also contain viscosity index improvers for example polymethacrylates, in particular of low molecular weight, thickeners for example of polyisobutene type, antioxidants e.g. amino or phenolic, . . . .

Method for Producing Microcapsules

Numerous methods are known for producing microcapsules containing a polymer shell and a solid or liquid core: by coating or by fluidized bed spraying, by interface polymerization in a dispersed medium, whether by radical polymerization or polycondensation. For radical polymerization one of the phases contains the dissolved monomer and the other one an initiator, and for polycondensation one of the monomers is dissolved in the continuous phase and the other one in the dispersed phase.

The known techniques for preparing microcapsules by interface polymerization in a dispersed medium involve oil-in-water emulsions. These techniques cannot be applied here since the addition of water to the medium would cause degradation of borates, a phenomenon which it is precisely desired to avoid by encapsulating in a polymer shell. The mode for preparing borates of hydrated alkali metals dispersed in the lubricating oil, from aqueous solutions of borates, comprises a step for controlled evaporation of the water. The re-addition of water in the method for encapsulating these borates would lead to undesirable modification of the initially formed crystals.

The subject of the present invention is a method for preparing microcapsules by interface polymerization, in which a hydrophobic phase denoted S1 containing a first monomer denoted M1 and one or more additives is dispersed in a continuous phase formed by an non-aqueous organic solvent denoted S2 non-miscible with the said hydrophobic phase and containing an initiator allowing the chain polymerization of M1 or a M2 monomer leading to a polycondensation reaction with M1, to form polymers or copolymers that are the constituents of the shell of the microcapsules. The methods for preparing microcapsules according to the invention preferably comprise the following steps:

(1) dissolving an oil-soluble monomer M1, precursor of a constituent polymer of the shell of the said microcapsules, in a hydrophobic phase S1 comprising one or more oils, waxes or greases of mineral, synthetic or natural origin, and optionally one or more additives for example borates of dispersed hydrated alkali metals, (2) forming a dispersion (or emulsion) of the mixture derived from step (1) in a continuous phase comprising a non-aqueous solvent S2 non-miscible with the hydrophobic phase S1, (3) adding to said continuous phase S2 either an initiator allowing the chain polymerization of M1 or a monomer M2 leading to a polycondensation reaction with M1, to form polymers or copolymers that are the constituents of the shell of the microcapsules.

The microcapsules obtained can then be filtered and optionally subjected to one or more washing steps.

f. Hydrophobic Phase S1:

The hydrophobic phase S1 may comprise one or more oils, waxes, greases of mineral, synthetic or natural origin, alone or in a mixture. S1 may for example comprise one or more mineral, synthetic or natural lubricant base oils, such as Group I mineral base oils of type 150 NS, or mineral base oils of Group II or III, synthetic base oils of polyalphaolefin type or esters, bases of natural origin for example containing methyl esters of fatty acids, alone or in a mixture . . . or any other base or mixture of lubricating bases adapted to such use. S1 may comprise mineral waxes for example comprising n-paraffins derived from petroleum resources, or Fischer Tropsch synthetic waxes or natural waxes, for example beeswax. S1 may also contain greases obtained by dispersion of a thickener which may be for example a metallic soap of fatty acids, simple or complex, or an inorganic thickener in one or more lubricant bases such as those described above for example.

This hydrophobic phase contains one or more additives, which may be soluble or dispersed in the hydrophobic phase by means of dispersants. For example, these are additives for lubricating compositions or greases, for example those used in automotive applications e.g. engine or transmission applications, marine applications, industrial applications. For example, and in particular, these are borates such as described above.

The method according to the invention allows said additives to be protected from water. Preferably the hydrophobic phase S1 contains one or more mineral, synthetic or natural lubricant base oils, and borates of alkali metals, optionally hydrated dispersed in the lubricant oil(s).

g. Solvent S2:

The solvent S2 forming the continuous phase in the method of the invention must be non-miscible in the hydrophobic phase S1. This can be obtained by using polar solvents, as solvent S2 having, preferably a dielectric constant higher than 25, more preferably higher than 30 in the interface polymerization methods of the invention. The polar nature minimizes the interactions with the hydrophobic phase, in particular the lubricant oils preferably used as borates dispersion medium to form the core of the microcapsules according to the invention, which in majority are non-polar.

The solvents having a dielectric constant higher than 25, and preferably higher than 30, form the most stable emulsions with the oily hydrophobic phase. These solvents are preferably aprotic. The effect of the aprotic nature is that it does not lead to degradation of borates.

Examples of solvents S2 adapted to the method of the invention are dimethylsulfoxyide (DMSO), 1-methyl-2-pyrrolidone, acetonitrile, formamide (methanamide), methylmethanamide, dimethylmethanamide (dimethylformamide), ethanamide, methylethanamide, dimethylethanamide. Acetonitrile is preferably used since it is able to form very stable emulsions with oil.

h. Monomers M1 and M2:

The methods of the invention in general are methods in which polymerization is conducted either via a mechanism of chain polymerization, with an initiator which may be a source of free radicals (e.g. peroxide) or a carbanion or a carbocation, or via a polycondensation method. The monomers M1 (and optionally M2 in the polycondensation methods) are preferably di- or trifunctional monomers i.e. they each comprise two or three reactive functions involved in the polymerization reaction, optionally different, preferably identical, per molecule.

This ensures the formation of polymers of high molecular weight, adapted to the formation of the microcapsules according to the invention, and increase the cross-linking which reduces the porosity of the shell. The mono-functional monomers may reduce and even stop the growth of the polymer chains before they reach a length adapted to the formation of capsules, whilst monomers comprising too high a number of reactive functions lead to very rapid growth of the molecular weight of the formed polymer, which may precipitate before the formation of the capsules. Persons skilled in the art will therefore choose the functionality of the polymer in relation to these principles.

The interface polymerization methods via polycondensation are given preference in the present invention. They particularly allow the preparation of microcapsules having a polymer shell of polyurea type.

In an interface polymerization method by polycondensation, the shell of the microcapsules is generally obtained by the polymerization of at least two monomers than are non-miscible with each other (one M2 being dissolved in the continuous phase S2, the other M1 being dissolved in the hydrophobic dispersed phase). Said monomers are well known to those skilled in the art and for example lead to the formation of polyamide shells, polyester shells, polyurea shells, polyurethane shells, or copolymers thereof, optionally with other monomers. Preferably in the methods according to the invention the use is made of monomers which lead to these polymers.

The constituent polymers of the capsule membrane can be obtained with the pairs of monomers (M1, M2) listed in Table 1 below:

TABLE 1 monomers which can be used for producing microcapsules via interface polymerization

| Monomer M2 soluble in continuous phase S2 | Monomer M1 soluble in the dispersed oil phase | Polymer obtained |
|---|---|---|
| Diol | Acid dichloride | Polyester |
| Diol | Diisocyanate | Polyurethane |
| Diamine | Acid dichloride | Polyamide |
| Diamine | Diisocyanate | Polyurea |

The oil-soluble monomers M1 which are preferably used in the method of the invention are chosen for example from among the triisocyanates, diisocyanates e.g. methylene diphenyl diisocyanate (MDI), 4,4'-dicyclohexylmethane diisocyanate (H12MDI), toluene diisocyanate (TDI), poly(1, 4-butanedioltoluene diisocyanate) (PBTDI) and polyfunctional aliphatic polyisocyanates, acid dichlorides such as dichlorides of terephthaloyl, of isophthaloyl and of phthaloyl, tri-functional acyl chlorides such as trimestyl chloride, 1,3, 5-benzenetricarbonyl trichloride, trimellitic anhydride chloride, trimellitoyl chloride, dichlorides of succinyl, of adipoyl, of decanedioyl, of sebacoyl. The M2 monomers soluble in the continuous phase S2 which are preferably used in the method of the invention are chosen for example from among the alkane diols such as 1,4-butanediol, 1,5-pentanediol, poly-(ethyleneoxide)glycol (PEOG) of various molecular weights, the alkane polyols such as dimethylolpropane, di- or tri-polyamines such as ortho-, meta- or para-phenylene diamine, 1,6-hexamethylene diamine (HMDA) or lysine, 1,2-ethylene diamine, butylene diamine, tri(2-aminoethyl)amine, triethylene tetramine. Having regard to the excellent properties of polyureas as anti-water barriers, preferable use is given in the method of the invention to di- or tri-amines, alone or in a mixture, as monomer M2, and to di- or triisocyanates, alone or in a mixture as monomer M1, in particular those cited above.

i. Surfactants:

The method of the invention comprises a step for emulsifying the oil phase containing the borates to be encapsulated and the M1 monomer in the continuous phase S2, and for stabilizing this emulsion. This emulsification step is preferably conducted using surfactants, preferably present in the continuous phase.

Any surfactant known to persons skilled in the art can be used for this purpose. Preference is given to surfactants with a hydrophilic-lipophilic balance (HLB) of between 10 and 15, adapted to the dispersion of oil phases such as the lubricant oil(s) contained in the core of the microcapsules according to the invention. Preferably, surfactants are chosen which do not interact with the monomers M1 (and optionally M2) used for the method according to the invention. The preferred surfactants are non-ionic surfactants derived from fats such as fatty alcohols, fatty amines, fatty acids, the esters of fatty acids and of monoalcohols or polyols e.g. sorbitan, whether or not these compounds are ethoylated, preferably ethoylated oleic acid, ethoylated tristyrylphenol, polyoxyethylene sorbitol hexaoleate.

EXAMPLES

Example 1

Preparation of the Microcapsules

The additive to be encapsulated is a hydrated potassium triborate of formula $KB3O5.H2O$, in the form of nanospheres of an average diameter 200 nm which are dispersed in a Group I mineral base oil of type 150 NS by a mixture of succinimide and calcium sulfonate dispersants. This dispersion has a Boron element content of 6.66% by weight.

10 grams of 4,4'-methyldiphenyldiisocyanate (MDI, monomer M1) are dissolved in 20 grams of the hydrated borate dispersion described above, to form the phase to be dispersed (solution 1). 160 grams of acetonitrile (S2) are mixed with 13.2 grams of surfactant (polyoxyethylene sorbitol hexaoleate) to form a first fraction of the continuous phase (solution 2). 4.6 grams of 1,6-hexamethylenediamine (HMDA, monomer M2) are dissolved in 20 grams of acetonitrile to form a second fraction of the continuous phase (solution 3).

Solution 2 is added to the reactor and placed under vigorous stirring (between 500 and 800 rpm). Solution 1 is added, still under stirring, to form an emulsion of solution 1 containing the borate in the continuous phase formed by solution 2.

After stabilization of the emulsion, solution 3 is slowly added, under a stirring speed of 200 rpm. The polycondensation of the MDI and HMDA takes place at the dispersed phase/continuous phase interface without the providing of any additional energy, at ambient temperature and is continued for 4 hours.

Microcapsules are formed consisting of a liquid core of base oil containing nanospheres of dispersed borate, and a polyurea shell. The capsules are then filtered and are subjected to successive washings with acetonitrile. They are then oven dried. The capsules thus formed are of homogeneous size, of the order of 100 µm in diameter according to the observations made under optical microscope (magnification 1000×).

Elementary analysis, performed using X-ray fluorescence on the capsules thus formed, shows the presence of the element potassium in the capsules which demonstrates the effective encapsulating of potassium triborate.

Example 2

The same procedure is followed as for Example 1, but:
solution 1 is formed of 3 grams of the hydrated borate dispersion described in Example 1, in which 1 gram of 4,4'-methyldiphenyldiisocyanate (MDI) was dissolved,
solution 2 is formed of 40 grams of acetonitrile mixed with 140 grams of surfactant (fatty acid with ethoylated long chain),
solution 3 is formed of 20 grams of acetonitrile in which 1 gram of 1.6 hexamethylenediamine (HMDA) was dissolved.

Observations under the microscope showed that capsules of diameter between 0.5 and 10 µm had been formed.

Example 3

Water Resistance

The water resistance of the microcapsules prepared in Examples 1 and 2 according to protocol given below was tested by simulating an oil/water mixture in a gearbox in service. The samples to be tested were prepared by re-dispersing, after washing, filtering and drying, about 10% by weight of these microcapsules in a Group I base oil of type 150 NS, using PIB succinimide dispersants. The control product was formed by dispersing nanospheres of hydrated sodium triborates in a 150 NS base oil of identical composition to the dispersion used to form the core of the microcapsules prepared in Examples 1 and 2.

The mixtures, containing the products to be tested and 1% by volume of water, have been prepared at 20° C. Then, they were mixed using a magnetic stirrer and the temperature brought to 20 to 50° C. over 10 minutes, holding the temperature at 50° C. for a further 20 minutes. The mixtures were then stored at room temperature and the limpidity measured at the start, after 1 day and after 10 days' storage.

The measurement of limpidity did not show any discrimination between the dispersions of microcapsules and the control dispersion. However, observations under optical microscope with ×1000 magnification evidenced the formation of bladed crystals of large size, of the order of 100 to 200 in the control. These crystals were not observed in the dispersions of microcapsules, either at the start, after 1 day or after 10 days' storage. The presence of a protective polymer shell, for the microcapsules, allowed the preventing of modification to the crystalline structure of borates in the presence of water.

The invention claimed is:

1. Microcapsules comprising:
a core containing one or more borates of alkali metals, dispersed in one or more mineral, synthetic or natural lubricant base oils; and
a polymer shell;
the borates being nanospheres,
the microcapsules being free of water.

2. The microcapsules according to claim 1, in which the borates of alkali metals are compounds of general formula:

$$MO_{1/2} \cdot mBO_{3/2} \cdot nH_2O \qquad (I)$$

where M is an alkali metal, m is a number between 2.5 and 4.5, and n is a number between 0.50 and 2.40, the monomer repeat unit of formula (I) possibly being repeated several times.

3. The microcapsules according to claim 1, wherein the polymer is chosen from among the polyesters, polyurethanes, polyamides, polyureas, or the copolymers thereof, polyacrylonitriles, vinyl resins or aminoplast resins.

4. The microcapsules according to claim 1, having a diameter of between 0.1 µm and 50 µm.

5. The microcapsules according to claim 1, wherein the borates are nanospheres of diameter between 1 and 300 nm.

6. A lubricating oil comprising a microcapsule, the microcapsule comprising:
a core containing one or more borates of alkali metals, dispersed in at least one oil taken from the group of: mineral, synthetic or natural lubricant base oils; and
a polymer shell;
the borates being nanospheres,
the microcapsules being free of water.

7. The lubricating oil according to claim 6, having a weight content of boron element, measured as per standard NFT 60-106, of between 500 and 5000 ppm.

8. The lubricating oil according to claim 7, further comprising at least one of:
one or more anti-wear and extreme-pressure additives; and
one or more friction modifiers, chosen from among monoesters of polyols and fatty acids.

9. The lubricating oil according to claim 7, being a transmission lubricant.

10. The microcapsules according to claim 1, being at least one of an anti-wear and extreme-pressure additive for lubricating compositions.

11. The microcapsules according to claim 1, prepared by an interface polymerization method comprising:
dispersing a hydrophobic phase denoted S1, containing a first monomer denoted M1 and one or more additives, in a continuous phase formed of a non-aqueous organic solvent denoted S2, the continuous phase being non-miscible with the hydrophobic phase and containing either an initiator allowing the chain polymerization of M1, or a monomer M2 leading to a polycondensation reaction with M1, to form polymers or copolymers that are the constituents of the polymer shell of the microcapsules,
wherein the one or more additives include the one or more borates of alkali metals.

* * * * *